(12) United States Patent
Lee et al.

(10) Patent No.: US 7,803,461 B2
(45) Date of Patent: Sep. 28, 2010

(54) SILICONE-ACRYLIC IMPACT MODIFIER HAVING IMPROVED COLORABILITY AND THERMOPLASTIC RESIN COMPOSITION COMPRISING THE SAME

(75) Inventors: Keon-suk Lee, Anyang-si (KR); Jeong-heon Ahn, Suncheon-si (KR); Jin-young Rew, Busan (KR); Jae-woung Ha, Daejeon (KR)

(73) Assignee: LG Chem, Ltd. (KR)

( * ) Notice: Subject to any disclaimer, the term of this patent is extended or adjusted under 35 U.S.C. 154(b) by 889 days.

(21) Appl. No.: 11/257,692

(22) Filed: Oct. 25, 2005

(65) Prior Publication Data

US 2006/0089456 A1    Apr. 27, 2006

(30) Foreign Application Priority Data

Oct. 25, 2004    (KR) .................. 10-2004-0085396

(51) Int. Cl.
*A61K 9/50* (2006.01)
*C09D 151/00* (2006.01)
*B01J 13/02* (2006.01)

(52) U.S. Cl. ............... 428/402.24; 523/201; 427/213.3; 427/213.31; 264/4.1; 264/4.32

(58) Field of Classification Search .... 428/402–402.24; 427/213.3–213.36; 264/4–4.7
See application file for complete search history.

(56) References Cited

U.S. PATENT DOCUMENTS

| 4,885,209 | A | * | 12/1989 | Lindner et al. | ............... 428/420 |
| 4,994,523 | A |   | 2/1991  | Sasaki et al.  | ................... 525/63 |
| 5,045,595 | A | * | 9/1991  | Wang           | .......................... 525/66 |
| 6,339,127 | B1 | * | 1/2002 | Miyatake et al. | ............ 525/106 |

FOREIGN PATENT DOCUMENTS

| KR | 2000-0076255 | 12/2000 |
| KR | 2002-0075901 | 10/2002 |
| KR | 2003-0092273 | 6/2005  |

* cited by examiner

*Primary Examiner*—James Seidleck
*Assistant Examiner*—Saira Haider
(74) *Attorney, Agent, or Firm*—Cantor Colburn LLP

(57) ABSTRACT

The present invention relates to a silicone-acrylic impact modifier having multi-layer structure and a thermoplastic resin composition containing the same, more precisely a silicone-acrylic impact modifier which is composed of i) silicone rubber seed containing one or more vinyl copolymers; ii) acrylic rubber core covering the seed; and iii) a shell containing one or more vinyl copolymers covering the acrylic rubber core, and a thermoplastic resin composition containing the same. The thermoplastic resin having the silicone-acrylic impact modifier of the present invention has improved impact resistance and colorability.

18 Claims, No Drawings

SILICONE-ACRYLIC IMPACT MODIFIER HAVING IMPROVED COLORABILITY AND THERMOPLASTIC RESIN COMPOSITION COMPRISING THE SAME

This application claims the benefit of the filing date of Korean Patent Application No. 10-2004-0085396, filed on Oct. 25, 2004, in the Korean Intellectual Property Office, the disclosure of which is incorporated herein in its entirety by reference.

TECHNICAL FIELD

The present invention relates to a silicone-acrylic impact modifier having multi-layer structure and a thermoplastic resin composition containing the polymer. More precisely, the present invention relates to a silicone-acrylic impact modifier having excellent impact resistance and colorability and a thermoplastic resin composition containing the same.

BACKGROUND ART

To enhance impact resistance and chemical resistance of a thermoplastic resin, an impact modifier containing rubber component has been added to produce a resin. As an impact modifier, methyl methacrylate-butadiene-styrene (MBS) resin, ethylene chloride (CPE) resin and acrylic resin have been generally used. However, high industrial development asks better impact modifier having improved impact strength, weather resistance and chemical resistance than the conventional impact modifier. Thus, a silicone impact modifier has been developed, which seems to have improved impact resistance resulted from the very low glass transition temperature of −120° C. It has been reported that when the silicone impact modifier is copolymerized with acrylic rubber, dispersibility of the resin is improved, resulting in the enhancement of weather resistance and impact resistance.

U.S. Pat. No. 4,994,523 describes that a silicone-acrylic impact modifier having excellent impact resistance and weather resistance is produced by the steps of polymerizing silicone polymer with acrylic rubber monomer and grafting aromatic monomer, cyan monomer or alkyl(metha)acrylate monomer onto the above produced polymer.

Korean Patent Publication No. 2002-0075901 describes that impact resistance of a resin can be greatly enhanced by polymerization of vinyl monomer in the presence of latex mixture of silicone rubber latex and acrylic rubber latex.

Korean Patent Application No. 2003-0092273 describes that a silicone-acrylic impact modifier having improved impact resistance, colorability and chemical resistance is produced by grafting aromatic monomer or non-aromatic monomer onto silicone rubber and then grafting acrylic rubber thereon, increasing the grafting efficiency of acrylic rubber.

Korean Patent Publication No. 2000-0076255 describes that a silicone rubber graft copolymer is produced by graft-polymerization of vinyl monomer on silicone polymer with narrow particle diameter distribution attributed to polymerization of silicone rubber in vinyl copolymer emulsion.

Although a thermoplastic resin composition containing such silicone-acrylic impact modifier has satisfactory low-temperature impact strength and weather resistance, the resin is limited in use because of poor pigment-colorability generated by the silicone rubber component.

DISCLOSURE OF THE INVENTION

It is an object of the present invention, to solve the above problem, to provide a silicone-acrylic impact modifier having multi-layer structure which is designed to have improved impact resistance and colorability.

It is another object of the present invention to provide a thermoplastic resin composition having excellent impact resistance and colorability.

To achieve the above objects, the present invention provides a silicone-acrylic impact modifier having high colorability that contains;

a) 1-40 weight % of silicone rubber seed containing i) 0.1-10 weight % (taking seed monomer weight as standard) of one or more vinyl copolymers; ii) 50-94.9 weight % (taking seed monomer weight as standard) of silicone rubber; and iii) 5-40 weight % (taking seed monomer weight as standard) of alkyl methacrylate monomer;

b) 20-80 weight % of acrylic rubber core containing i) 95.0-99.9 weight % (taking core monomer weight as standard) of alkyl acrylate in which carbon number of alkyl group is 2-8; and ii) 0.1-5.0 weight % (taking core monomer as standard) of cross-linking agent monomer and covering the above seed; and c) 19-40 weight % of shell containing i) 95-99.9 weight % (taking shell monomer weight as standard) of one or more vinyl copolymers and ii) 0.1-5.0 weight % (taking shell monomer weight as standard) of the cross-linking agent monomer and additionally one or more vinyl copolymers covering the above rubber core.

Hereinafter, the present invention is described in detail.

The present invention provides a silicone-acrylic impact modifier having multi-layer structure composed of silicone rubber seed, acrylic rubber core and one or more vinyl copolymer shells having high glass transition temperature, which characteristically shows excellent impact resistance and chemical resistance as well as colorability, by being produced with silicone rubber seed containing one or more vinyl copolymers, when it is applied to thermoplastic resins such as polycarbonate (PC), polycarbonate/polybutyleneterephthalate (PC/PBT) alloy resin and vinyl chloride resin, etc.

To improve impact resistance, chemical resistance and colorability of a resin, the present inventors prepared the final silicone-acrylic impact modifier having multi-layer structure composed of seed, core and shell by the following steps; a) producing silicone rubber seed latex containing one or more vinyl copolymers; b) adding alkyl acrylate monomer having 2-8 carbons in alkyl group to the above a), followed by emulsion polymerization to prepare core latex; c) adding one or more vinyl monomers having high glass transition temperature to the above b), followed by grafting to a core, resulting in the formation of a shell.

Explanation on seed is provided hereinafter.

To produce a seed of the present invention, polymerization with silicone rubber containing one or more vinyl copolymers having glass transition temperature of over room temperature is performed, followed by grafting with alkyl methacrylate. The size of the seed particle is varied with the degree of cross-linking and composition of vinyl copolymers, method for preparing emulsion of silicone monomer, graft ratio of silicone rubber to alkyl methacrylate and the amount of emulsifier, which means controlling such conditions enables the regulation of the size of the seed particle. And a silicone-acrylic impact modifier endowing improved impact resistance and colorability to a thermoplastic resin can be prepared by regulating the size of the seed particle.

To achieve the above object, the seed of the present invention is composed of i) 0.1-10 weight % (taking the seed monomer weight as standard) of one or more vinyl copolymers; ii) 50-94.9 weight % (taking the seed monomer weight as standard) of silicone rubber; and iii) 5-40 weight % (taking the seed monomer weight as standard) of alkyl methacrylate monomer.

There is no limitation in size of the seed latex particle, but considering the impact resistance and colorability of the final silicone-acrylic impact modifier, the size is preferred to be in the range of 10-300 nm and more preferred to be in the range of 40-300 nm. When the size of the seed particle is less than 10 nm, the final silicone-acrylic impact modifier cannot guarantee satisfactory impact resistance to a thermoplastic resin. In the meantime, when the size of the seed particle is over 300 nm, colorability of the resin is decreased.

As the vinyl monomer of the above i), one or more compounds selected from a group consisting of aromatic vinyl monomers whose glass transition temperature is over room temperature such as styrene, α-methyl styrene, p-methyl styrene, p-butyl styrene and 3,4-dichloro styrene; alkyl acrylate such as ethyl acrylate; alkyl methacrylate such as methyl methacrylate and glycidyl methacrylate; benzyl methacrylate; and cyan vinyl monomer such as acrylonitrile, methacrylonitrile are preferably used.

The vinyl copolymer of the above i) contains cross-linking agent monomer by 0.1-5.0 weight %, and is preferably one or more compounds selected from a group consisting of divinylbenzene, 3-butandiol diacrylate, 1,3-butandiol dimethacrylate, 1,4-butandiol diacrylate, 1,4-butandiol dimethacrylate, allyl acrylate, allyl methacrylate, trimethylol propane triacrylate, tetraethyleneglycol diacrylate and tetraethyleneglycol dimethacrylate.

To prepare silicone rubber of ii), 0.1-10 weight % of vinyl copolymer of i) for 100 weight % of total silicone rubber, cyclic organic siloxane containing 3-7 annuluses, siloxane containing vinyl group and silane cross-linking agent are mixed together with water, emulsifier and acid catalyst, followed by polymerization with the emulsified mixture for over 12 hours at 50-100° C., which is then cooled down slowly to the room temperature, leading to aging for over 24 hours. At this time, emulsification is induced by i) stirring for more than 5 minutes using a homomixer having high speed rotatory power of 10,000 rpm, or ii) stirring for more than 5 hours using a stirrer at the speed of 200 rpm.

The preferable content of the organic siloxane containing 3-7 annuluses is 60-95 weight % for the total silicone rubber. Hexamethylcyclotrisiloxane, octamethylcyclotetrasiloxane, dodecamethylcyclohexasiloxane, trimethyltriphenylcyclosiloxane, tetramethyltetraphenylcyclotetrasiloxane, and octaphenylcyclotetrasiloxane can be used as the organic siloxane herein singly or jointly and among these compounds, octamethylcyclotetrasiloxane is more preferred.

Siloxane having vinyl group facilitates grafting of vinyl monomer to silicone rubber, and the preferable content of the siloxane is 3-20 weight % for the total silicone rubber. As a siloxane, triethoxyvinylsilane, 3-(trimethoxysilyl)propyl acrylate and 3-(trimethoxysilyl)propyl methacrylate can be used singly or jointly, and among these, 3-(trimethoxysilyl) propyl methacrylate is more preferred.

The preferable content of the silane cross-linking agent is 1.9-10 weight % for the total silicone rubber, and 3 functional or 4 functional silane cross-linking agent such as trimethoxymethylsilane, triethoxymethylsilane, triethoxyphenylsilane, tetramethoxysilane, tetraethoxysilane, and tetrabutoxysilane can be used as the silane cross-linking agent singly or jointly.

Anion emulsifier is preferred for the preparation of silicone rubber and is exemplified by sodium dodecylbenzenesulfonate and polyoxyethylene sodium lorylphenylethersulfonate.

For a catalyst used for the preparation of silicone rubber, inorganic acid such as sulfuric acid or hydrochloric acid or organic acid such as dodecylbenzenesulfonic acid, dodecylsulfonic acid and trifluoroacetic acid can be used. To set a proper polymerization speed, pH has to be adjusted to 1-3 by adding the above catalyst, either organic acid or inorganic acid.

Alkyl methacrylate monomer of the above iii) is to increase the grafting efficiency of acrylic rubber core to silicone rubber seed, and the preferable content of the monomer is 5-40 weight % for the seed monomer. Alkyl methacrylate monomer such as methyl methacrylate, ethyl methacrylate or 2-ethylhexyl methacrylate is emulsified with water and an emulsifier, which is then serially injected with initiator to silicone rubber latex prepared by polymerization for 2 hours, during which polymerization is induced at 50-90° C.

Explanation on acrylic rubber core is provided hereinafter.

Rubber core of the present invention is prepared by adding i) 95.0-99.9 weight % (taking core monomer weight as standard) of alkyl acrylate whose carbon number in alkyl group is 2-8; and ii) 20-80 weight % of a monomer containing 0.1-5.0 weight % (taking core monomer weight as standard) of cross-linking agent monomer to 1-40 weight % of silicone rubber seed latex containing one or more vinyl copolymers produced in the above, and then emulsion polymerization is induced therein. At this time, alkyl acrylate monomer and cross-linking agent monomer are emulsified by water and emulsifier, which is i) injected at a time, ii) injected several times, or iii) injected serially into seed latex for 1-2 hours. Upon completion of the reaction, aging was induced for 1 hour.

A conventional emulsifier or a polymerization initiator can be used for the emulsion polymerization.

The alkyl acrylate can be prepared by mixing one or more compounds selected from a group consisting of alkyl acrylates having 2-8 carbon numbers such as ethyl acrylate, propyl acrylate, isopropyl acrylate, butyl acrylate, hexyl acrylate, octyl acrylate, 2-ethylhexyl acrylate, etc.

The preferable content of cross linking agent monomer is 0.1-5.0 weight % of the total monomers used to form a core. When the content of cross-linking agent monomer is less than 0.1 weight %, cross-linking degree becomes too low to play a role as a rubber, resulting in the decrease of dispersibility and weather resistance. On the contrary when the content is more than 5.0 weight %, the property of brittleness appears, resulting in the remarkable decrease of impact strength. The cross-linking agent monomer can be prepared by mixing one or more compounds selected from a group consisting of allyl acrylate, allyl methacrylate or trimethylolpropane triacrylate.

Explanation on the formation of shell is provided hereinafter.

The shell of the present invention is prepared by graft polymerization of copolymer, which comprises methyl methacrylate monomer having excellent compatibility with such resins as polycarbonate, PC/PBT alloy, etc, aromatic monomer such as styrene or methacrylonitrile, to rubber core. The shell with high compatibility with thermoplastic resins brings an excellent impact modifying effect by inducing dispersion of the impact modifier. The colorability of silicone-acrylic impact modifier can also be improved by the selection of kinds and the regulation of the weights of aromatic monomers and cyan monomers.

It is preferred for the shell of the present invention to take 19-40 weight % of the total weight of impact modifier.

Shell polymerization is performed as follows: i) 95.0-99.9 weight % (taking the weight of the shell monomer as standard) of one or more vinyl monomers; and ii) 0.1-5.0 weight % (taking the weight of the shell monomer as standard) of cross-linking agent monomer are mixed with water and emulsifier for emulsification. The emulsified solution is serially injected together with initiator for 2-4 hours into the latex polymerized with core, inducing polymerization at 50-90° C. The cross-linking agent monomer used for the shell polymerization can be the same one as the monomer used for rubber core polymerization, and thus their functions are the same.

For vinyl monomer of i), it is preferred to select one or more compounds from a group consisting of aromatic vinyl monomers such as styrene, α-methyl styrene, p-methyl styrene, p-butyl styrene and 3,4-dichloro styrene whose glass transition temperature is over room temperature, alkyl acrylates such as ethyl acrylate, alkyl methacrylates such as methyl methacrylate and glycidyl methacrylate, benzyl methacrylate, methacrylic acid and cyanovinyl monomers such as acrylonitrile and methacrylonitrile.

As an emulsifier used in each step of the present invention, well-known emulsifiers such as sodiumdodecylsulfate, sodium oleic acid, potassium oleic acid, sodium rosin acid, alkylbenzenesulfonic acid, sodium alkylbenzenesulfonic acid, alkylsulfonic acid, benzylmethyldodecylammonium hydroxide, octyltrimethylammonium chloride, dodecyltrimethalammonium chloride, etc can be used singly or jointly, but among all those conventional emulsifiers, sodiumdodecylsulfate is more preferred considering that the polymerization herein is performed in wide range of pH.

Any polymerization initiator that is able to start the reaction can be used for each step of present invention, and is exemplified by ammoniumpersulfate, potassiumpersulfate, benzoyl peroxide, azobisbutylonitrile, butyl hydroperoxide, cumin hydroperoxide, dodecylbenzenesulfonic acid, etc. However, persulfates and hydroperoxides or dodecylbenzenesulfonic acid are preferably selected, according to the properties of seed, core, shell monomers and stability of a system.

The impact modifier having multi-layer structure produced by using the seed provided by the above procedure has the particle size of 100-500 nm and solid content by 20-50 weight %.

The impact modifier latex prepared by the method of the present invention finally coheres to prepare impact modifier powder. To induce cohesion, ion-exchanged water is added to the final latex, lowering the content of solid powder to less than 15 weight %. Then, metal salt such as calcium chloride or aluminum lactate is added thereto, leading to cohesion. The temperature of the cohered mixture is raised to over 90° C., followed by aging and cooling. The mixture is then washed with ion-exchanged water, filtered, and dried to give impact modifier.

The present invention provides a thermoplastic resin composition having excellent impact strength and colorability which is prepared by adding 0.5-20 weight part of acrylic impact modifier having multi-layer structure to 100 weight part of thermoplastic resin like polycarbonate resin, PC/PBT alloy resin and vinyl chloride resin.

The thermoplastic resin having improved properties by containing the impact modifier having multi-layer structure can be properly formed and molded at proper temperatures by conventional molding methods including extrusion molding, injection molding and compression molding.

BEST MODE FOR CARRYING OUT THE INVENTION

Practical and presently preferred embodiments of the present invention are illustrative as shown in the following Examples and Comparative Examples.

However, it will be appreciated that those skilled in the art, on consideration of this disclosure, may make modifications and improvements within the spirit and scope of the present invention.

EXAMPLE 1

(Polymerization of Vinyl Copolymer)

634.43 g of ion-exchanged water was injected in a reactor, and then the temperature of the reactor was raised to 70° C. in the presence of nitrogen. When the temperature of ion-exchanged water reached 70° C., 13.33 g of sodiumdodecylsulfate (SLS, 3 weight % solution), 69.44 g of styrene (ST), 7.72 g of acrylonitrile (AN), 2.40 g of allylmethacrylate (AMA) and 0.45 g of divinylbenzene (DVB) were added to the reactor all at once. When the temperature of the reactor was stably kept at 70° C., 23.33 g of potassiumpersulfate (KPS, 3 weight % solution) was added, in order to start polymerization.

The polymerization conversion of the produced vinyl copolymer was 97% and the size of the copolymer particle was 113 nm.

(Preparation of Silicone Rubber Seed)

11.12 g of the vinyl copolymer produced above, 326.65 g of ion-exchanged water, 7.34 g of sodium dodecylbenzenesulfonate (SDBS, 9.5 weight % solution), 0.99 g of dodecylbenzenesulfonic acid (DBSA, 70 weight % solution), 96.69 g of octamethylcyclotetrasiloxane (OCTS), 4.84 g of triethoxymethylsilane (TEOMS), and 9.67 g of trimethoxysilylpropyl methacrylate (MPTS) were put in a vessel, followed by stirring for 5 minutes at 10,000 rpm in a homomixer, resulting in emulsion. The temperature of emulsion was set at 85° C. and reaction was induced in the presence of nitrogen for 18 hours. Upon completion of the reaction, the emulsion stood for 24 hours at room temperature, then neutralized with 18.77 g of sodium carbonate (2 weight % solution) to pH 7.8.

34.75 g of ion-exchanged water, 19.92 g of sodiumdodecylsulfate (SLS, 3 weight % solution) and 27.80 g of methylmethacrylate (MMA) were mixed and stirred to prepare emulsion. The emulsified monomer was loaded onto the latex for 2 hours at 70° C. in the presence of nitrogen, during which 23.33 g of potassiumpersulfate (KPS, 1.5 weight % solution) was added to induce polymerization, resulting in silicone rubber seed.

The conversion of latex was 85% and the size of the polymerized latex particle was 195 nm.

(Formation of Acrylic Rubber Core)

800 g of ion-exchanged water was additionally loaded to the seed prepared above, and then the temperature of the reactor was kept as 70° C. The content of silicone seed took 15 weight % of the total weight of the whole impact modifier.

300 g of ion-exchanged water, 133.33 g of sodiumdodecylsulfate (3 weight % solution), 497.90 g of butylacrylate and 2.20 g of allylmethacrylate were stirred together for emulsification. 6.67 g of the mixture (3 weight % solution) of ferros sulfate (FES) and disodium ethylenediaminetetraacetate (EDTA) were added to silicone seed latex in a reaction vessel, to which the above emulsified monomer was loaded three times at one hour intervals. After 15 minutes from each loading of the monomer, 14.2 g of sodium formaldehyde sulfoxylate (SFS, 3.52 weight % solution) and 5 g of t-butylhydroperoxide (tBHP, 10 weight % solution) were added, resulting in the polymerization of acrylic rubber core.

Upon completion of the reaction, aging was induced for one hour. The conversion of the latex was 99% and the size of the polymerized latex particle was 225 nm.

(Formation of Hard Shell)

220 g of ion-exchanged water, 166.67 g of sodiumdodecylsulfate (SLS, 3 weight % solution), 300.46 g of styrene (ST), 39.04 g of acrylonitrile (AN), 1.75 g of allylmethacrylate (AMA) and 8.75 g of divinylbenzene (DVB) were stirred together to prepare emulsion.

The emulsified monomer was loaded to the reactor where core polymerization had been completed at 70° C. for 2 hours in the presence of nitrogen, during which 71.02 g of sodium formaldehyde sulfoxylate (SFS, 3.52 weight % solution) and 17 g of t-butylhydroperoxide (tBHP, 10 weight % solution) were also loaded for further reaction.

The conversion of the latex was 99% and the size of the final latex particle was 238 nm.

EXAMPLE 2

The impact modifier was prepared by the same manner as described in the above Example 1 except that the amounts of styrene (ST), acrylonitrile (AN) and divinylbenzene which were added for the polymerization of vinyl copolymer of Example 1 were respectively 69.04 g, 7.67 g, and 0.89 g.

EXAMPLES 3 AND 4

The impact modifier was prepared by the same manner as described in Examples 1 and 2 except that methylmethacrylate (MMA) was used instead of acrylonitrile (AN) for the polymerization of vinyl copolymer.

EXAMPLES 5-8

The impact modifier was prepared by the same manner as described in Examples 1-4 except that emulsion was prepared not by using a homomixer but by stirring at 200 rpm for 2 hours for the preparation of silicone seed latex.

EXAMPLES 9-12

The impact modifier was prepared by the same manner as described in Examples 1-4 except that the contents of styrene (ST) and acrylonitrile (AN) were changed to 254.66 g and 84.88 g, respectively, for the polymerization of the shell.

EXAMPLES 13-16

The impact modifier was prepared by the same manner as described in Examples 1-4 except that the contents of styrene (ST) and acrylonitrile (AN) were changed to 203.70 g and 137.80 g, respectively, for the polymerization of the shell.

EXAMPLES 17-20

The impact modifier was prepared by the same manner as described in Examples 1-4 except that 339.50 g of methylmethacrylate (MMA) was used instead of styrene (ST) and acrylonitrile (AN) for the polymerization of the shell.

COMPARATIVE EXAMPLE 1

The impact modifier was prepared by the same manner as described in Example 1 except that vinyl copolymer was not added for the polymerization of silicone seed.

COMPARATIVE EXAMPLE 2

The impact modifier was prepared by the same manner as described in Comparative Example 1 except that 339.50 g of methylmethacrylate (MMA) was used instead of styrene (ST) and acrylonitrile (AN) for the polymerization of the shell.

COMPARATIVE EXAMPLE 3

The impact modifier was prepared by the same manner as described in Example 1 except that core formation process was omitted from the entire production processes of the impact modifier and the modifier was thus composed of only silicone rubber and a shell.

EXPERIMENTAL EXAMPLE (Preparation of Thermoplastic Resin)

100 weight part of polycarbonate (PC200-1, LG-Dow) was mixed with 3 weight part of each impact modifier produced in each Example and Comparative Example, to which 0.5 weight part of additive and 0.02 weight part of pigment were added. Extrusion was performed with twin screw extruder (Leistritz) at 200 rpm, 60 kg/hr of weighing speed, and at 250-320° C. to obtain pellet. This pellet was injected using EC100 φ30 injector (ENGEL) at 250-320° C.

Each Izod impact strength was measured at room temperature and at −30° C. from ⅛ inch sample prepared according to ASTM D-256 and the results are shown in Table 1.

To evaluate the colorability, CIE Lab color of each sample processed by coloring agent was measured by spectrophotometer Color-eye 3100. The difference of color value from that of the impact modifier having high colorability without silicone rubber described in Korean Patent Application No. 2004-0057069 was measured to evaluate colorability of the product. That is, $\Delta E$ (meaning the difference of color value)= $(\Delta L^{*2}+\Delta a^{*2}+\Delta b^{*2})^{1/2}$. Small number of $\Delta E$ means high colorability, and big number of $\Delta E$ means low colorability.

TABLE 1

| Compartment | | Example 1 | Example 2 | Example 3 | Example 4 | Example 5 | Example 6 | Example 7 | Example 8 |
|---|---|---|---|---|---|---|---|---|---|
| Vinyl copolymer composition (Weight part) | ST | 69.44 | 69.04 | 69.44 | 69.04 | 69.44 | 69.04 | 69.44 | 69.04 |
| | AN | 7.72 | 7.67 | — | — | 7.72 | 7.67 | — | — |
| | MMA | — | — | 7.72 | 7.67 | — | — | 7.72 | 7.67 |
| | DVB | 0.45 | 0.89 | 0.45 | 0.89 | 0.45 | 0.89 | 0.45 | 0.89 |
| Preparation method of silicone emulsion | | Homomixer, 10,000 rpm, 5 min. | | | | Stirrer, 200 rpm, 2 hr. | | | |
| Shell monomer composition | ST | 300.46 | | | | | | | |
| | AN | 39.04 | | | | | | | |

TABLE 1-continued

| | | | | | | | | |
|---|---|---|---|---|---|---|---|---|
| Izod impact strength (25° C., kgcm/cm) | 77.2 | 76.8 | 76.6 | 73.0 | 78.6 | 78.9 | 81.2 | 75.4 |
| Izod impact strength (−30° C., kgcm/cm) | 31.2 | 28.5 | 33.8 | 30.6 | 25.7 | 26.2 | 23.8 | 25.2 |
| Colorability (ΔE) | 4.5 | 4.4 | 6.4 | 6.1 | 4.7 | 3.4 | 5.8 | 3.7 |

| Compartment | | Example 9 | Example 10 | Example 11 | Example 12 | Example 13 | Example 14 | Example 15 | Example 16 |
|---|---|---|---|---|---|---|---|---|---|
| Vinyl copolymer composition (Weight part) | ST | 69.44 | 69.04 | 69.44 | 69.04 | 69.44 | 69.04 | 69.44 | 69.04 |
| | AN | 7.72 | 7.67 | — | — | 7.72 | 7.67 | — | — |
| | MMA | — | — | 7.72 | 7.67 | — | — | 7.72 | 7.67 |
| | DVB | 0.45 | 0.89 | 0.45 | 0.89 | 0.45 | 0.89 | 0.45 | 0.89 |
| Preparation method of silicone emulsion | | Homomixer, 10,000 rpm, 5 min. | | | | | | | |
| Shell monomer composition | ST | | 254.66 | | | | 203.70 | | |
| | AN | | 84.88 | | | | 137.80 | | |
| Izod impact strength (25° C., kgcm/cm) | | 81.2 | 80.4 | 79.8 | 77.3 | 81.2 | 79.4 | 72.4 | 80.3 |
| Izod impact strength (−30° C., kgcm/cm) | | 33.5 | 31.6 | 33.1 | 31.7 | 34.2 | 30.8 | 35.6 | 33.8 |
| Colorability (ΔE) | | 6.4 | 5.5 | 7.0 | 7.2 | 8.3 | 6.6 | 9.7 | 8.2 |

| Compartment | | Example 17 | Example 18 | Example 19 | Example 20 | Comparative Example 1 | Comparative Example 2 | Comparative Example 3 |
|---|---|---|---|---|---|---|---|---|
| Vinyl copolymer composition | ST | 69.44 | 69.04 | 69.44 | 69.04 | — | — | 69.44 |
| | AN | 7.72 | 7.67 | — | — | | | |
| | MMA | — | — | 7.72 | 7.67 | | | 7.72 |
| | DVB | 0.45 | 0.89 | 0.45 | 0.89 | | | 0.45 |
| Preparation method of silicone emulsion | | Homomixer, 10,000 rpm, 5 min. | | | | | | |
| Shell monomer composition | ST | | | — | | 300.46 | — | 300.46 |
| | AN | | | — | | 39.04 | — | 39.04 |
| | MMA | | 339.50 | | | — | 339.50 | — |
| Izod impact strength (25° C., kgcm/cm) | | 72.5 | 77.3 | 71.6 | 72.3 | 76.8 | 79.2 | 77.6 |
| Izod impact strength (−30° C., kgcm/cm) | | 32.6 | 29.8 | 34.2 | 30.5 | 33.6 | 32.7 | 23.7 |
| Colorability (ΔE) | | 10.2 | 9.6 | 10.5 | 9.7 | 15.2 | 19.8 | 20.0 |

As shown in Table 1, low-temperature impact strength of the impact modifier of the invention was similar to that of the conventional silicone-acrylic impact modifier when silicone-rubber seed containing one or more vinyl copolymers was loaded to the silicone-acrylic impact modifier. In the meantime, colorability of the impact modifier was much improved.

INDUSTRIAL APPLICABILITY

As explained hereinbefore, the present invention provides a silicone-acrylic impact modifier having multi-layer structure composed of silicone-rubber seed, acrylic rubber core and a shell comprising one or more vinyl copolymers having high glass transition temperature which is characterized by the use of silicone-rubber seed that plays a key role in keeping the same excellent impact resistance and chemical resistance as those of the conventional silicone-acrylic impact modifier but providing improved colorability when it is applied to thermoplastic resins including polycarbonate (PC), PC/PBT alloy resin and vinyl chloride resin, etc. Therefore, the impact modifier of the present invention can be effectively used in various industrial fields.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A silicone-acrylic impact modifier having multi-layer structure, which is characterized by containing 1-40 weight % of a silicone rubber seed containing one or more vinyl copolymers; 20-80 weight % of an acrylic rubber core covering the silicone rubber seed; and 19-40 weight % of a shell containing one or more vinyl copolymers and covering the acrylic rubber core, wherein the silicone rubber seed is characterized by containing i) 0.1-10 weight % of one or more vinyl copolymers; ii) 50-94.9 weight % of a silicone rubber layer covering the vinyl copolymers; and iii) 5-40 weight % of an alkyl methacrylate monomer covering the silicone rubber layer wherein the vinyl copolymer of i) is one or more compounds having a glass transition temperature of at least room temperature and selected from the group consisting of an aromatic vinyl monomer of styrene, α-methyl styrene, p-methyl styrene, p-butyl styrene and 3,4-dichloro styrene; an alkyl acrylate of ethyl acrylate; an alkyl methacrylate of methyl methacrylate and glycidyl methacrylate; benzyl methacrylate; and a cyano vinyl monomer such as acrylonitrile and methacrylonitrile.

2. The silicone-acrylic impact modifier as set forth in claim 1, wherein the vinyl copolymer of i) contains cross-linking agent monomer that is included by 0.1-5.0 weight % and is one or more compounds selected from a group consisting of divinylbenzene, 3-butandiol diacrylate, 1,3-butandiol dimethacrylate, 1,4butandiol diacrylate, 1,4-butandiol dimethacrylate, allyl acrylate, allyl methacrylate, trimethylol propane triacrylate, tetraethyleneglycol diacrylate and tetraethyleneglycol dimethacrylate.

3. The silicone-acrylic impact modifier as set forth in claim 1, wherein the silicone-rubber of ii) is characterized by containing 0.1-10 weight % of the vinyl copolymer of i); 60-95 weight % of cyclic organic siloxane containing 3-7 annulus; 3-20 weight % of siloxane containing vinyl group; and 1.9-10 weight % of silane cross-linking agent.

4. The silicone-acrylic impact modifier as set forth in claim 3, wherein the cyclic organic siloxane containing 3-7 annulus is characteristically one or more compounds selected from a group consisting of hexamethylcyclotrisiloxane, octamethylcyclotetrasiloxane, dodecamethylcyclohexasiloxane, trimethyltriphenylcyclosiloxane, tetramethyltetraphenylcyclotetrasiloxane and octaphenylcyclotetrasiloxane.

5. The silicone-acrylic impact modifier as set forth in claim 3, wherein the siloxane containing the vinyl group is one or more compounds selected from a group consisting of triethoxyvinylsilane, 3-(trimethoxysilyl)propyl acrylate and 3-(trimethoxysilyl)propyl methacrylate.

6. The silicone-acrylic impact modifier as set forth in claim 3, wherein the silane cross-linking agent is 3 functional or 4 functional cross-linking agent and is one or more compounds selected from a group consisting of trimethoxymethylsilane, triethoxymethylsilane, triethoxyphenylsilane, tetramethoxysilane, tetraethoxysilane and tetrabutoxysilane.

7. The silicone-acrylic impact modifier as set forth in claim 1, which is characteristically produced by the steps of emulsifying the alkyl methacrylate monomer of iii) and grafting the emulsified monomer to the silicone rubber of ii).

8. The silicone-acrylic impact modifier as set forth in claim 7, wherein the alkyl methacrylate is one or more compounds selected from a group consisting of methyl methacrylate, ethyl methacrylate and 2-ethylhexyl methacrylate.

9. The silicone-acrylic impact modifier as set forth in claim 1, wherein the acrylic rubber core is composed of i) 95.0-99.9 weight % of alkyl acrylate having 2-8 carbons in its alkyl group; and
ii) 0.1-5.0 weight % of cross-linking agent monomer.

10. The silicone-acrylic impact modifier as set forth in claim 9, wherein the alkyl acrylate monomer and the cross-linking agent monomer are emulsified with water and emulsifier, and then the emulsified solution is i) loading all at a time at 50-90° C. , ii) loading several times or iii) loading serially to seed latex for 1-2 hours.

11. The silicone-acrylic impact modifier as set forth in claim 9, wherein the alkyl acrylates having 2-8 carbons in its alkyl group is one or more compounds selected from a group consisting of ethyl acrylate, propyl acrylate, isopropyl acrylate, butyl acrylate, hexyl acrylate, octyl acrylate and 2-ethylhexyl acrylate.

12. The silicone-acrylic impact modifier as set forth in claim 1, wherein the vinyl copolymer included in the shell is composed of i) 95-99.9 weight % of one or more vinyl monomers; and
ii) 0.1-5.0 weight % of cross-linking agent monomer.

13. The silicone-acrylic impact modifier as set forth in claim 12, wherein the vinyl monomer of i) is one or more materials selected from a group consisting of aromatic vinyl monomers such as styrene, α-methyl styrene, p-methyl styrene, p-butyl styrene and 3,4-dichloro styrene; alkyl methacrylates such as methyl methacrylate and glycidyl methacrylate; benzyl methacrylate; methacrylic acid; and cyanovinyl monomers such as acrylonitrile and methacrylonitrile.

14. The silicone-acrylic impact modifier as set forth in claim 9, wherein the cross-linking agent monomer is one or more compounds selected from a group consisting of allyl acrylate, allyl methacrylate, trimethylolpropane triacrylate and divinylbenzene.

15. The silicone-acrylic impact modifier as set forth in claim 1, wherein the size of silicon rubber seed particle is 10-300 nm in diameter.

16. The silicone-acrylic impact modifier as set forth in claim 1, wherein the size of latex particle is 100-500 nm in diameter.

17. A thermoplastic resin composition which is characteristically produced by mixing 100 weight part of thermoplastic resin and 0.5-20 weight part of the silicone-acrylic impact modifier of claim 1.

18. The silicone-acrylic impact modifier as set forth in claim 12, wherein the cross-linking agent monomer is one or more compounds selected from a group consisting of allyl acrylate, allyl methacrylate, trimethylolpropane triacrylate and divinylbenzene.

* * * * *